Patented Sept. 11, 1951

2,567,821

UNITED STATES PATENT OFFICE 2,567,821

ACYLAMINO-ANTHRAQUINONE VAT DYESTUFFS

Eduard Moergeli, Neuewelt, Munchenstein, Switzerland, assignor to Ciba Limited, Basel, Switzerland No Drawing. Application February 2, 1949, Serial No. 74,264. In Switzerland January 30, 1948

12 Claims. (Cl. 260—377)

According to this invention valuable anthraquinone vat dyestuffs are made by introducing into a 1-aminoanthraquinonyl-2-aryl ketone in the 4-position of the anthraquinone nucleus an amino group which is acylated by an aromatic or aliphatic-aromatic carboxylic acid.

As starting materials for the present process there may be used, for example, 1-aminoanthraquinonyl-2-aryl-ketone. The latter may be obtained in known manner, for example, by reacting 1-amino-anthraquinone-2-carboxylic acid chloride with an aromatic compound in the presence of aluminium chloride to form the corresponding ketone. As aromatic compounds there may be employed, for example, unsubstituted aromatic hydrocarbons containing 6–12 carbon atoms, such as naphthalene, diphenyl and especially benzene, and also substituted aromatic hydrocarbons which are capable of taking part in the aforesaid reaction, such as toluene, halogen-benzenes, etc.

These starting materials are converted, in accordance with the present invention, into 1-amino-4-acylamino-anthraquinonyl-2-aryl ketones of the general formula

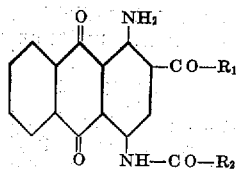

In the above formula $R_1$ represents an aromatic radical containing 6–12 carbon atoms which is free from ionizable groups such as carboxylic and sulfonic acid groups, preferably an aromatic hydrocarbon radical which is unsubstituted or contains at most halogen atoms as substituents, and —CO—$R_2$ represents the radical of an aromatic or aliphatic-aromatic carboxylic acid containing at most 13 carbon atoms, which may contain substituents in the aromatic nucleus.

Advantageously, these compounds are made by monoacylating a 1:4-diaminoanthraquinonyl-2-aryl ketone. The latter ketones are obtainable, for example, from 1-aminoanthraquinonyl-2-aryl ketones or from 1:4-dihalogen-anthraquinonyl-2-aryl ketones by the process of U. S. patent application Ser. No. 74,265, filed February 2, 1949. It is also possible in known manner to exchange a halogen atom directly for an acylated amino group. Thus, the new dyestuffs can be made, for example, by introducing a halogen atom into a 1-aminoanthraquinonyl-2-aryl ketone in the 4-position of the anthraquinone nucleus, and reacting the resulting halogen derivative with a carboxylic acid amide appropriate for the present invention.

Illustrative of the residue —CO—$R_2$ in the above formula are the residues of carboxylic acids of the aromatic or aliphatic-aromatic series, which contain at most 13 carbon atoms. There may be mentioned, for example, the residues of benzoic acid and of nuclear substitution products of benzoic acid, such as para-chloro-, para-bromo- or 2:4- or 2:5-dichloro-benzoic acid, para-toluic acid, para-methoxy- or para-ethoxy-benzoic acid, and also β-naphthoic acid, diphenyl carboxylic acid, cinnamic acid, etc.

The products so obtained are valuable vat dyestuffs. They are suitable for dyeing and especially for printing a very wide variety of vegetable fibers such as cotton, linen, and artificial silk and staple fibers of regenerated cellulose. In general the yield bright violet to reddish blue tints.

It is surprising that valuable dyestuffs yielding deep tints can be obtained in this manner. It could not be expected that violet- to blue-dyeing vat dyestuffs of good absorptive capacity would be obtained by introducing a simple aryl ketone radical into the 2-position of 1-amino-4-benzoylamino-anthraquinone which is not suitable for dyeing. In German Patents Nos. 545,001 and 546,229 are disclosed red-dyeing vat dyestuffs which contain two molecules of 1-aminoanthraquinone linked together in their 2-positions by a 4:4'-diketo-diphenyl bridge. It is stated that 1-amino-2-diphenoyl-anthraquinone, which contains only one amino anthraquinone molecule, possesses no dyeing properties, as the leuco compound has no affinity for cellulose fibers. In contradistinction to this known product having no dyeing properties, the new products of the present invention, which contain an acylamino group in the 4-position of the anthraquinone nucleus, have very pronounced dyeing properties. The fact that the tints of the dyeings are markedly shifted towards blue is of importance, having regard to the relative simplicity of the molecule.

The dyeings and prints produced with the new dyestuffs are in general distinguished by excellent fastness to light and chlorine. Special mention must also be made of the fastness to rain drops of these dyeings and prints. The new dyestuffs are also of special interest owing to the fact that they discharge well and therefore provide very fast ground dyeings for goods subjected to color discharge.

The following examples illustrate an advantageous method of making the new products in accordance with the invention, wherein an acid chloride is reacted with a 1:4-diaminoanthraquinonyl-2-aryl ketone in the presence of an acid-binding agent under conditions such that no di-acylated products are formed. It is surprising that real difficulties in this respect are not encountered, especially if unduly high reaction temperatures and a great excess of the acid chloride are avoided. In the examples the parts are by weight unless otherwise stated, and the relationship of parts by weight to parts by volume is the same as that of the kilogram to the liter:

Example 1

A mixture of 6.6 parts of 1:4-diamino-2-(para-chlorobenzoyl)-anthraquinone, 4.5 parts of para-chlorobenzoyl chloride, 6 parts by volume of pyridine and 150 parts by volume of ortho-dichlorobenzene is heated to 110–115° C., and then stirred until the condensation to form 1-amino-4-(para-chlorobenzoylamino)-2-(para-chlorobenzoyl)-anthraquinone is complete, which can easily be determined by microscopic examination and should be the case after at most 2 hours. The whole is then allowed to cool somewhat; the dyestuff of the formula

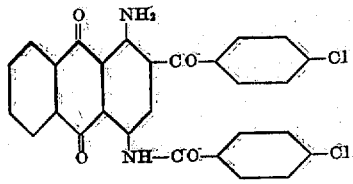

is separated by filtering with suction while still warm, and it is freed from adherent solvent by washing with alcohol and water. It dissolves in concentrated sulfuric acid with a green coloration, dyes cotton and viscose artificial silk from an olive green vat reddish-blue tints having good properties of wet fastness, and yields on cotton prints of powerful reddish-blue tints having excellent fastness to light.

By using in this example instead of the para-chlorobenzoyl chloride, 5.5 parts of para-bromobenzoyl chloride, and proceeding otherwise in the same manner there is obtained a dyestuff having very similar tinctorial properties, which can be used for printing cotton and also for producing white discharges. By acylation with an equivalent quantity of para-toluic acid chloride a dyestuff is obtained which yields prints on cotton of somewhat bluer tints. Dyestuffs which are obtained with anisoyl chloride or cinnamoyl chloride also yield somewhat bluer tints.

Example 2

6.6 parts of 1:4-diamino-2-(para-chlorobenzoyl)-anthraquinone are stirred with 5.2 parts of 2:5-dichlorobenzoyl chloride in 150 parts by volume of ortho-dichlorobenzene and 6 parts by volume of pyridine for 45 minutes at 110–115° C. The whole is allowed to cool somewhat and the dyestuff of the formula

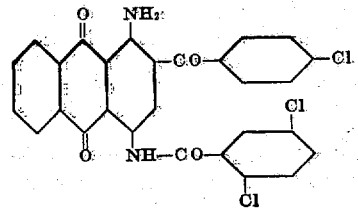

is separated by filtering with suction. It dissolves in concentrated sulfuric acid with a Bordeaux red coloration. It yields on cotton prints of violet tints which are fast to light and raindrops.

The 1:4-diamino-2-(para-chlorobenzoyl)-anthraquinone used in the foregoing examples melts at 227° C. (uncorrected) and is obtained by the amination of 1:4-dichloro-2-(para-chlorobenzoyl)-anthraquinone (melting at 245° C. uncorrected).

Example 3

A mixture of 6 parts of 1:4-diamino-2-(meta:para-dichlorobenzoyl)-anthraquinone, 3.9 parts of para-chlorobenzoyl chloride, 6 parts by volume of pyridine and 150 parts by volume of ortho-dichlorobenzene is stirred for 1 hour at 110° C. The whole is then allowed to cool somewhat and the dyestuff which crystallizes in blue needles is separated by filtering with suction. It dissolves in concentrated sulfuric acid with a green coloration and yields on cotton pure reddish blue prints having good properties of fastness, especially an excellent fastness to light.

By using this example, instead of the para-chlorobenzoyl chloride, an equivalent quantity of benzoyl chloride there is obtained a dyestuff of the formula

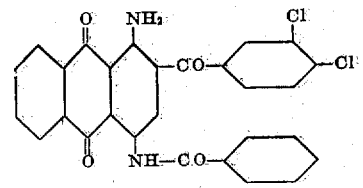

which yields somewhat less reddish blue tints on the fibre.

The 1:4-diamino-2-(meta:para-dichlorobenzoyl)-anthraquinone used in this example is obtained from 1:4-dichloro-2-(meta:para-dichlorobenzoyl)-anthraquinone (melting at 213–213.5° C. uncorrected), by the toluene sulfonamide method. It crystallizes from ortho-dichlorobenzene in the form of blue needles and melts at 243° C. (uncorrected).

Example 4

1.7 parts of para-toluic acid chloride are added dropwise to a suspension of 3 parts of 1:4-diamino-2-(meta:para-dichlorobenzoyl)-anthraquinone in 90 parts by volume of ortho-dichlorobenzene and 3 parts by volume of pyridine, and the whole is then heated for 1 hour at 110–115° C. After cooling to 70–80° C. the dyestuff which crystallizes in the form of blue needles is separated by filtering. It dissolves in concentrated sulfuric acid with a green coloration and in the vat with an olive-green coloration, and yields on cotton prints having clear reddish-blue tints which are of excellent fastness to chlorine and light.

By using in this example instead of the aforesaid acid chloride, an equivalent quantity of para-fluorobenzoyl chloride, there is obtained a dyestuff which yields on cotton and viscose artificial silk somewhat more reddish blue prints.

Example 5

A mixture of 6 parts of 1:4-diamino-2-(meta:para-dichlorobenzoyl)-anthraquinone, 4.5 parts of 2:5-dichlorobenzoyl chloride, 6 parts by volume of pyridine and 150 parts by volume of ortho-dichlorobenzene is stirred for 1 hour at 110–115° C., and then filtered at 90° C. In this manner there is obtained a dyestuff which yields on cotton and viscose artificial silk prints having violet tints which are fast to raindrops and light.

Example 6

A mixture of 5 parts of 1:4-diamino-2-(para-fluorobenzoyl)-anthraquinone, 3.4 parts of para-chlorobenzoyl chloride, 5 parts by volume of pyridine and 150 parts by volume of ortho-dichlorobenzene is stirred for 1 hour at 110°–115° C. After working up, the resulting 1-amino-4-(para-chlorobenzoylamino) - 2 - (para-fluorobenzoyl)-anthraquinone of the formula

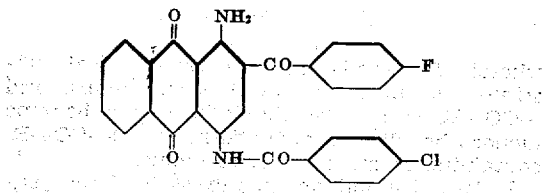

is obtained in the form of a blue dyestuff. It dissolves in concentrated sulfuric acid with a green coloration and yields prints having reddish blue tints.

By acrylation with another acid chloride, such as para-bromobenzoyl chloride, para-iodo-benzoyl chloride or meta-ω-trifluoromethylbenzoyl chloride, there is obtained a dyestuff having similar tinctorial properties. On the other hand the dyestuff obtained by acylation with β-naphthoic acid chloride yields substantially bluer tints.

Example 7

41 parts of 1:4-diamino - 2 - benzoylanthraquinone are heated in 23 parts of para-chlorobenzoyl chloride, 600 parts by volume of ortho-dichlorobenzene and 20 parts by volume of pyridine for 4 hours at 115–125° C. After cooling, the dyestuff of the formula

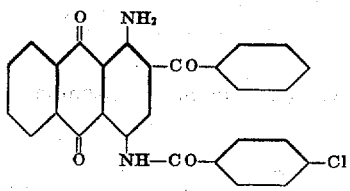

is separated by filtration, washed with alcohol and then with water, and dried. It dissolves in concentrated sulfuric acid with an olive-green coloration and dyes fibers from a hydrosulfite vat, after being suspended in air, reddish-blue tints of excellent fastness to light.

By acylation with para-bromobenzoyl chloride or benzoyl chloride there are obtained dyestuffs which yield somewhat bluer tints as compared with the dyestuff obtained in the preceding paragraph of this example.

Example 8

A mixture of 3 parts of 1:4-diamino-2-(para-toluyl)-anthraquinone, 2.2 parts of para-chlorobenzoylchloride, 60 parts by volume of chlorobenzene and 3 parts by volume of pyridine are heated while stirring for ½ to 1 hour at 110–115° C., then allowed to cool to 50° C., and the dyestuff is separated by filtration. It dissolves in concentrated sulfuric acid with an olive-green coloration and yields on cotton and viscose artificial silk prints having reddish-blue tints.

By using in this example, instead of para-chlorobenzoyl chloride, an equivalent quantity of para-toluic acid chloride there is obtained a dyestuff which yields on textile materials prints of somewhat bluer tints.

Example 9

3 parts of 1:4-diamino-2-naphthoyl-anthraquinone are condensed with 2 parts of para-chlorobenzoyl chloride in 60 parts by volume of chlorobenzene and 3 parts by volume of pyridine by stirring at 110° C. for ¾ hour, whereby naphthyl - [1 - amino - 4 - (para-chlorobenzoylamino) - anthraquinonyl - 2] - ketone is formed. The dyestuff of the formula

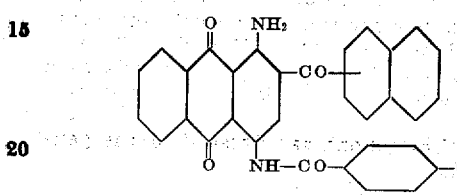

which precipitates in the form of needles having a bronze lustre yields on cotton prints of approximately the same tint as those of the product obtained in Example 6 by acylating with β-naphthoic acid chloride.

The 1:4 - diamino-2-naphthoyl-aminoanthraquinone used as starting material is a blue crystalline powder melting at 209° C. (uncorrected). It is obtained from naphthyl-(1:4-dichloranthraquinonyl-2)-ketone by the toluene sulphonamide method. The latter compound can be obtained from 1:4-dichloranthraquinone-2-carboxylic acid chloride and naphthalene by the Friedel and Crafts' synthesis. It crystallises from toluene in the form of yellowish lamellae and then melts at 171–173° C. (uncorrected). By analysis to determine the chlorine, carbon and hydrogen contents of the product it is found to correspond closely to the empirical formula $C_{25}H_{12}O_3Cl_2$. Which of the two possible compounds in view of the nuclear isomerism is present, or whether the product is a mixture of the two forms difficult to separate, has not been determined.

Example 10

2 parts of para-chlorobenzoyl chloride and 2.8 parts of 1:4-diamino-2-anisoyl-anthraquinone are reacted together in 60 parts by volume of chlorobenzene and 2.8 parts by volume of pyridine by being heated for ½ hour at 110–115° C. A dyestuff is obtained which yields on cotton prints having powerful reddish-blue tints. The prints also have an excellent fastness to light.

Example 11

2 parts of 1-amino-4-para-chlorobenzoylamino-2-benzoylanthraquinone obtained as described in the first paragraph of Example 7 are vatted with 8 parts by volume of caustic soda solution of 36° Bé. and 4 parts of sodium hydrosulfite in 300 parts of water at 40–50° C. The resulting stock vat is added to a dyebath which contains in 2500 parts of water 4 parts by volume of caustic soda solution of 36° Bé. and 2 parts of sodium hydrosulfite. 100 parts of well wetted cotton are entered at 25° C., 50 parts of sodium chloride are added after ¼ hour, and dyeing is carried on at 25–30° C. for 1 hour. The cotton is squeezed and centrifuged, oxidized in the air, rinsed cold, acidified, again rinsed and, if desired, soaped at the boil. The material is dyed a fast reddish blue tint.

What I claim is:
1. An anthraquinone vat dyestuff of the general formula

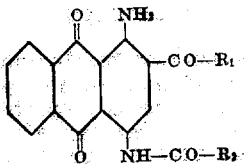

wherein $R_1$ stands for an aromatic radical containing from 6 to 12 carbon atoms and is free from ionizable salt-forming substituents, and —CO—$R_2$ stands for the radical of a monocarboxylic acid of the formula HO—CO—$R_2$ containing at most 13 carbon atoms and belonging to one of the series: aromatic and aliphatic-aromatic.

2. An anthraquinone vat dyestuff of the general formula

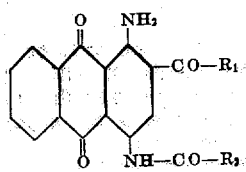

wherein $R_1$ stands for an aromatic radical containing from 6 to 12 carbon atoms and is free from ionizable salt-forming substituents, and —CO—$R_2$ stands for the radical of an aromatic monocarboxylic acid of the formula HO—SO—$R_2$ containing at most 13 carbon atoms.

3. An anthraquinone vat dyestuff of the general formula

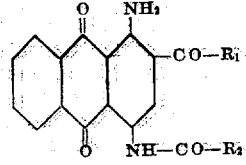

wherein $R_1$ stands for an aromatic radical containing from 6 to 12 carbon atoms and is free from ionizable salt-forming substituents, and —CO—$R_2$ stands for the radical of a benzene monocarboxylic acid of the formula HO—CO—$R_2$ containing at most 9 carbon atoms.

4. An anthraquinone vat dyestuff of the general formula

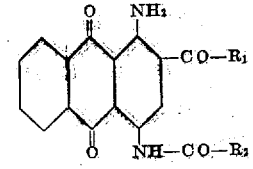

wherein $R_1$ stands for a benzene radical substituted at most by two halogen atoms, and —CO—$R_2$ stands for the radical of a monocarboxylic acid of the formula HO—SO—$R_2$ containing at most 13 carbon atoms and belonging to one of the series: aromatic and aliphatic-aromatic.

5. An anthraquinone vat dyestuff of the general formula

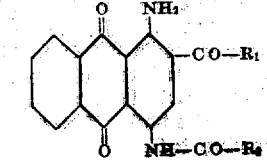

wherein $R_1$ stands for a benzene radical substituted at most by two halogen atoms, and —CO—$R_2$ stands for the radical of an aromatic monocarboxylic acid of the formula HO—CO—$R_2$ containing at most 13 carbon atoms.

6. An anthraquinone vat dyestuff of the general formula

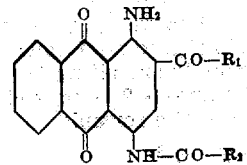

wherein $R_1$ stands for a benzene radical substituted at most by two halogen atoms, and —CO—$R_2$ stands for the radical of a benzene monocarboxylic acid of the formula HO—CO—$R_2$ containing at most 9 carbon atoms.

7. An anthraquinone vat dyestuff of the general formula

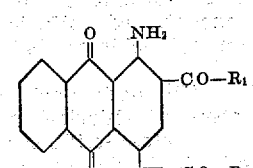

wherein $R_1$ and $R_2$ stand for benzene radicals containing together at least two halogen atoms but being free from other substituents.

8. The vat dyestuff of the formula

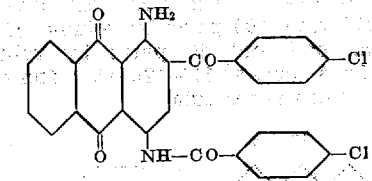

9. The vat dyestuff of the formula

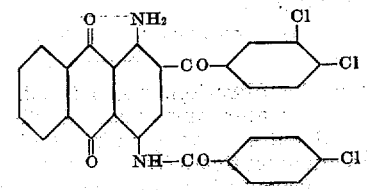

10. The vat dyestuff of the formula

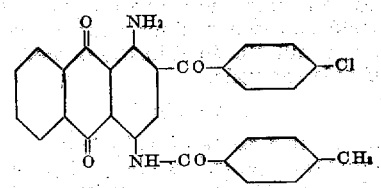

11. The vat dyestuff of the formula

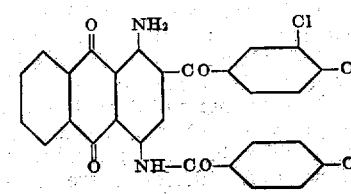

12. The vat dyestuff of the formula
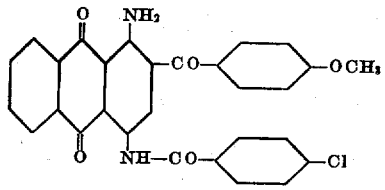
EDUARD MOERGELI.
REFERENCES CITED
The following references are of record in the file of this patent:
UNITED STATES PATENTS
| Number | Name | Date |
|---|---|---|
| 2,299,141 | Hauser | Oct. 20, 1942 |
OTHER REFERENCES
Barnett: Anthracene and Anthraquinone (1929), pp. 215-216.

Certificate of Correction

Patent No. 2,567,821                         September 11, 1951

EDUARD MOERGELI

It is hereby certified that error appears in the printed specification of the above numbered patent requiring correction as follows:

Column 2, line 20, for "the yield" read *they yield*; column 5, line 26, for "acrylation" read *acylation*; column 7, lines 33 and 63, for "$HO-SO-R_2$" read $HO-CO-R_2$;

and that the said Letters Patent should be read as corrected above, so that the same may conform to the record of the case in the Patent Office.

Signed and sealed this 15th day of January, A. D. 1952.

[SEAL]

THOMAS F. MURPHY,
*Assistant Commissioner of Patents.*